Figure 1:
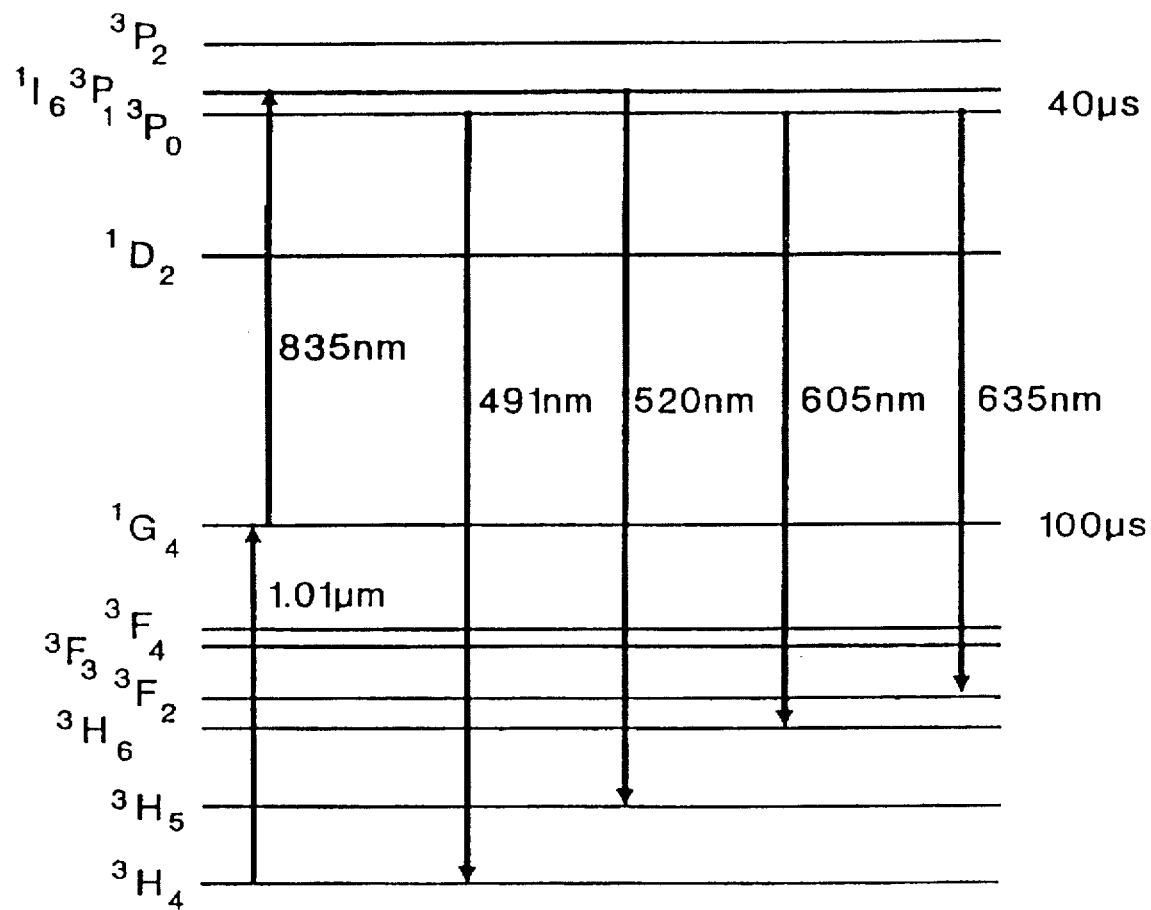

United States Patent [19]

Smart et al.

[11] Patent Number: 5,727,007
[45] Date of Patent: Mar. 10, 1998

[54] PRASEODYMIUM DOPED WAVEGUIDE LASERS

[75] Inventors: Richard Gordon Smart, Naperville, Ill.; David Colin Hanna, Southampton, United Kingdom; Anne Christine Tropper, Ropley, United Kingdom

[73] Assignee: Amoco Corporation, Chicago, Ill.

[21] Appl. No.: 140,201

[22] PCT Filed: Apr. 24, 1992

[86] PCT No.: PCT/GB92/00766

§ 371 Date: May 9, 1994

§ 102(e) Date: May 9, 1994

[87] PCT Pub. No.: WO92/20125

PCT Pub. Date: Nov. 12, 1992

[51] Int. Cl.$^6$ .................................................. H01S 3/30
[52] U.S. Cl. .................................................. 372/6; 372/40
[58] Field of Search .................................................. 372/6, 40, 41

[56] References Cited

U.S. PATENT DOCUMENTS 5,185,847  2/1993  Ferrier ........................ 372/40
5,309,452  5/1994  Ohishi ........................ 372/6

Primary Examiner—Leon Scott, Jr.
Attorney, Agent, or Firm—Stephen G. Mican

[57] ABSTRACT

The invention is based on the discovery that under certain conditions lasing at room temperature can be achieved in a $Pr^{3+}$-doped fluorozirconate fiber pumped in the infrared at 1.01 μm and 835 nm, the lasing taking place in the blue (491 nm), green (520 nm), orange (605 nm) and red (635 nm and 715 nm). One laser comprises a length of $Pr^{3+}$-doped potical waveguide such as a fiber, and means for exciting the $Pr^{3+}$ ions to an energy level in the band ($^3P_2$, $^1I_6$, $^3P_1$, $^3P_0$), in which the $Pr^{3+}$ concentration is in the range substantially 50 ppm to substantially 10,000 ppm (by weight). The $Pr^{3+}$ concentration is preferably in the range substantially 200 ppm to substantially 2,000 ppm (by weight). The optical fiber is preferably a fluorozirconate fiber doped at the foregoing concentrations with $Pr^{3+}$ ions. The fiber preferably comprises a doped core clad with a further glass. The excitation means is preferably arranged to excite the $Pr^{3+}$ ions from the $^3H_4$ level, and this is preferably achieved by upconversion by way of the $^1G_4$ level, but excitation may be achieved by transfer of energy from a co-dopant.

6 Claims, 3 Drawing Sheets

PRASEODYMIUM DOPED WAVEGUIDE LASERS

This invention relates to lasers and particularly to lasers for producing visible radiation.

There is currently a great deal of interest in the development of simple and compact sources of coherent visible radiation. Two promising techniques for the development of such sources are second harmonic generation, either directly of the output from laser diodes [1] or of the output from a laser diode-pumped laser [2], and upconversion lasing where the energy from two or more photons from a pump source are absorbed by a single ion which subsequently emits a single higher energy photon.

A variety of upconversion laser systems based on both multi ion [3] and single ion [4] processes have been demonstrated. This technique has the advantage of simplicity, in that no stabilised resonant cavity is needed, but also the disadvantage that in most cases the efficiency of upconversion is found to be strongly temperature dependent so that cooling to liquid nitrogen (or lower) temperatures is required. However, Allain et al [5] have recently demonstrated an efficient $Ho^{3+}$ doped fluorozirconate fibre laser operating in the green at room temperature with red krypton laser pumping.

Efforts are being made to develop a blue laser for which a variety of uses are envisaged, including use in a compact disc player where the correspondingly small spot size could provide an increase in storage capacity.

Whilst the Allain et al [5] laser does not produce blue light, that laser demonstrated the great benefit of using the fibre geometry where the small core diameter allowed the high intensities required for efficient upconversion to be maintained over a long interaction length. Allain et al [6] have also previously reported on $Pr^{3+}$-doped fluorozirconate fibre lasers operating in the orange and red when pumped with an argon laser operating at 476.5 nm.

The present invention is based on our discovery that under certain conditions we have achieved lasing at room temperature in a $Pr^{3+}$-doped fluorozirconate fibre pumped in the infrared at 1.01 μm and 835 nm, the lasing taking place in the blue (491 nm), green (520 nm), orange (605 nm) and red (635 nm and 715 nm).

One great attraction of pumping at infrared wavelengths is that high power laser diodes are available and so it may be possible to construct efficient, high power, all-solid-state blue green and red sources based on upconversion in $Pr^{3+}$-doped fibres. Such sources may be expected to find applications in areas such as optical data storage, undersea communications and projection televisions.

According to one aspect of the invention a laser comprises a length of $Pr^{3+}$-doped optical waveguide, and means for exciting the $Pr^{3+}$ ions to an energy level in the band ($^3P_2$, $^1I_6$, $^3P_1$, $^3P_0$), in which the $Pr^{3+}$ concentration is in the range substantially 50 ppm to substantially 10,000 ppm (by weight).

The waveguide is preferably in the form of a fibre.

The $Pr^{3+}$ concentration is preferably in the range substantially 200 ppm to substantially 2,000 ppm (by weight).

The optical fibre is preferably a fluorozirconate fibre doped at the foregoing concentrations with $Pr^{3+}$ ions.

The fibre preferably comprises a doped core clad with a further glass.

The numerical aperture of the clad fibre is preferably in the range substantially 0.1 to substantially 0.5, and is typically 0.15.

The core diameter of the fibre is preferably in the range substantially 1 μm to 5 μm.

The excitation means is preferably arranged to excite the $Pr^{3+}$ ions from the $^3H_4$ level, and this is preferably achieved by upconversion by way of the $^1G_4$ level, but excitation may be achieved by transfer of energy from a co-dopant, preferably another rare earth ion.

Excitation by way of the $^1G_4$ level is preferred because the energy gap from $^3H_4$ to $^1G_4$ corresponds to 1.01 μm and that from the $^1G_4$ to the $^1I_6$, $^3P_1$ common level in said band is 835 nm, both in the infrared range for which powerful infrared sources are available. The excitation means preferably comprises first excitation means for exciting the $Pr^{3+}$ ions from $^3H_4$ to $^1G_4$, and second excitation means for exciting the ions from $^1G_4$ to the $^1I_6$, $^3P_1$, $^3P_0$, $^3P_2$ levels.

It may, however, at relatively high concentrations of $Pr^{3+}$ ions be possible to populate the $^1G_4$ level by an avalanche process (photon avalanche upconversion) such that the excitation means need provide a single wavelength excitation from the $^1G_4$ level to said band.

Instead of cladding the fibre core with a single layer of glass, two cladding layers of different refractive indexes might be employed, the radially outer cladding layer being of lower refractive index. One of the lasers used as the pumping agency could then be directed into the inner layer of the cladding where lasing at a suitable first infrared wavelength could be achieved and which pumps the ions in the core. A second suitable infrared laser wavelength is also launched into the core, thus achieving the upconversion pumping.

These two fibres would share a common resonator, such that the infrared emission from one fibre provides one pump for the $Pr^{3+}$-doped fibre, and the other infrared pump is launched externally.

According to a second aspect of the invention a laser comprises a $Pr^{3+}$-doped optical waveguide means, first excitation means for exciting the $Pr^{3+}$ ions from the $^3H_4$ level to the $^1G_4$ level, second excitation means for exciting the ions from the $^1G_4$ level to a level in the band ($^3P_2$, $^1I_6$, $^3P_1$, $^3P_0$), and reflection means so arranged in relation to the waveguide that lasing is produced for at least two visible wavelengths.

The waveguide means is preferably an optical fibre.

Preferably the reflection means is arranged such that lasing is produced at at least three visible wavelengths, one of which is the blue transition 491 nm from $^3P_0$ to $^3H_4$.

A third aspect of the invention comprises operating a laser in accordance with either the first or second aspects of the invention at substantially room temperature (eg 20° C.) to produce at least one visible wavelength.

According to a fourth aspect of the invention a laser comprises a $Pr^{3+}$-doped optical waveguide means, and infrared diode laser means arranged to excite the $Pr^{3+}$ ions to the bands ($^3P_2$, $^1I_6$, $^3P_1$, $^3P_0$).

A fifth aspect of the invention comprises a $Pr^{3+}$-doped optical waveguide means, providing high gain amplification, at visible wavelengths, suitable for amplifying visible diode lasers and other visible sources.

Figure 2:
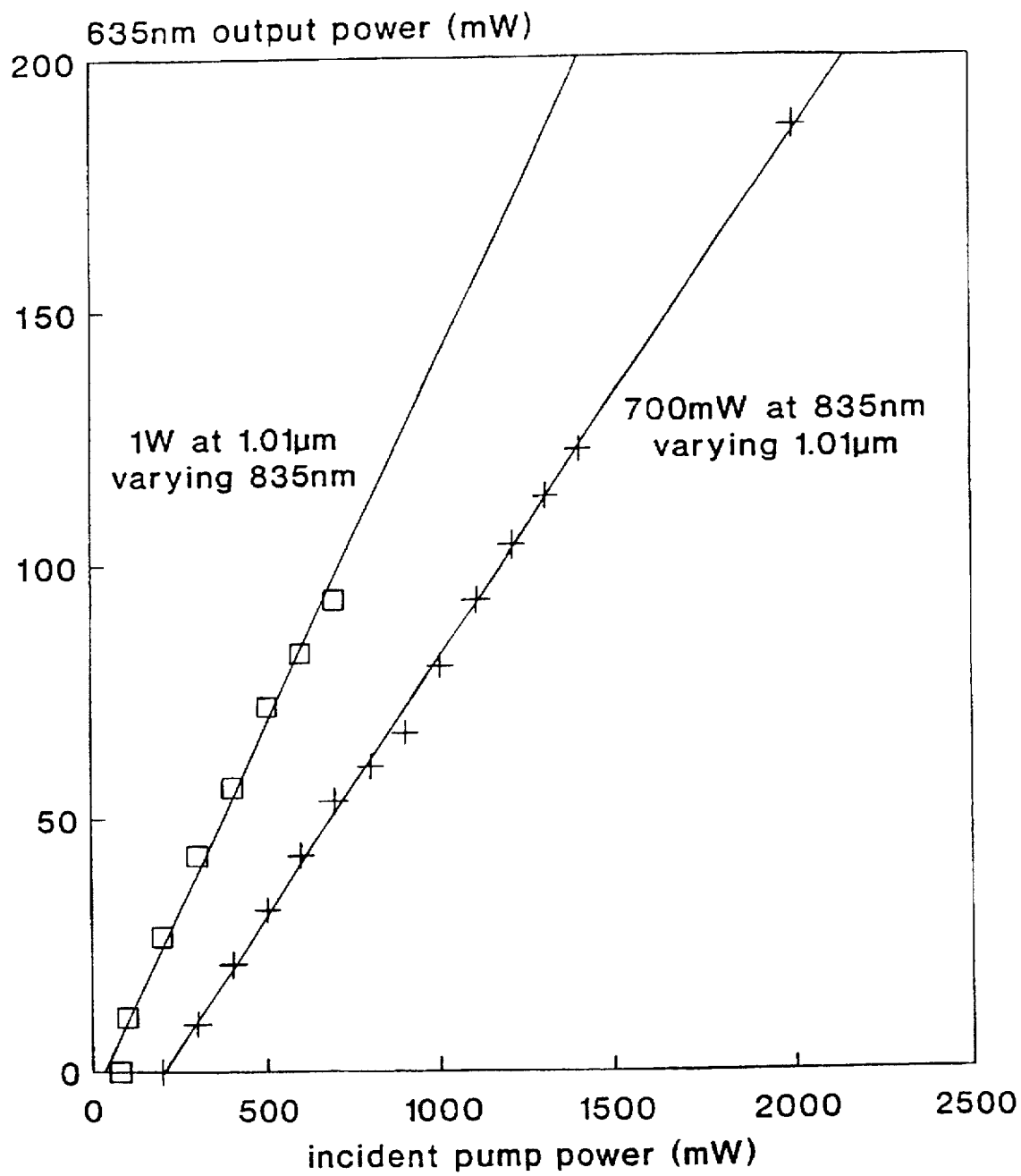
Figure 3:
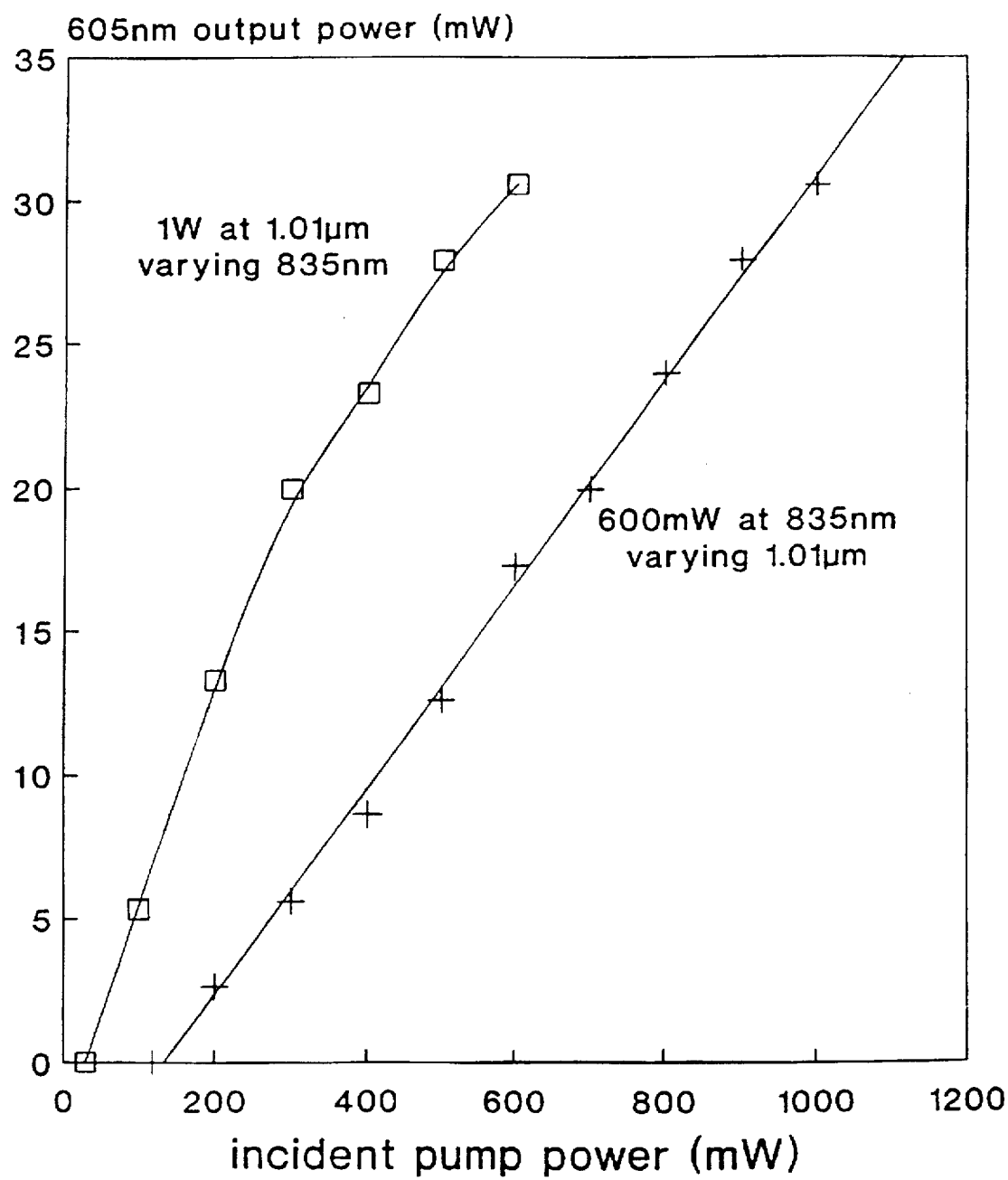

Some experiments to demonstrate the feasibility of a laser in accordance with the invention will now be described, by way of example only, with reference to the accompanying drawings in which:

FIG. 1 is an energy level diagram for $Pr^{3+}$-doped ZBLANP glass showing pumping scheme and laser transitions, FIG. 2 shows output power at 635 nm as a function of pump power for a $Pr^{3+}$-doped ZBLANP fibre laser (fibre length=10 m), FIG. 3 shows output power at 605 nm as a function of pump power for a $Pr^{3+}$-doped ZBLANP fibre laser (fibre length=1.2 m).

EXPERIMENTS

The fibre used for the experiments described here had a ZBLANP core doped with $Pr^{3+}$ ions at a concentration of 560 ppm (by weight) and a cladding of ZBLAN glass.

ZBLANP is a zirconium barium lanthanum aluminium sodium lead fluoride.

ZBLAN is a zirconium barium lanthanum aluminium sodium fluoride.

The core diameter of the fibre was 4.6 μm and the numerical aperture 0.15, implying a cut-off wavelength for the $LP_{11}$ mode of 0.9 μm. An energy level diagram for the $Pr^{3+}$ ion in a ZBLANP host glass is shown in FIG. 1. A Ti:sapphire laser tuned to 1.01 μm was used to excite $Pr^{3+}$ ions from the $^3H_4$ ground state to the $^1G_4$ multiplet. A second Ti:sapphire laser tuned to 835 nm was used to provide excitation from the $^1G_4$ multiplet to the thermally coupled $^3P_1$, $^1I_6$ and $^3P_0$ levels.

Initial experiments on the red laser transition were carried out with a fibre length of approximately 10 meters. Pump light from both Ti:sapphire lasers was combined using a polarization rotator and beamsplitter. This light was launched co-propagating into the fibre by a ×20 microscope objective at an efficiency of ≈30–40% for each pump beam. At the launch end the fibre was butted against a dielectric mirror of >99% reflectivity from 600 nm to 640 nm and ≈80% transmission at both pump wavelengths. The laser cavity was completed by the ≈4% Fresnel reflection arising from the fibre/air interface. The pump power from the Ti:sapphire laser operating at 835 nm was set at 700 mW incident on the launch objective. The laser power at 635 nm ($^3P_0$-$^3F_2$ transition) was then monitored as a function of the power from the Ti:sapphire laser operating at 1.01 μm and these results are shown in FIG. 2. The slope efficiency with respect to incident 1.01 μm pump power was ≈9.6%. The maximum power extracted from this laser was ≈185 mW. This data point was obtained by tuning the pump wavelength to 995 nm where 2 W of pump power were available and represents an overall power conversion efficiency of nearly 7% for infrared light to the red. The pump power was then set to 1 W at 1.01 μm and the red output power at 635 nm measured as a function of 835 nm pump power. This data set is also shown in FIG. 2. The slope efficiency with respect to incident 835 nm pump power was ≈14%. Some saturation of the 635 nm output power with respect to 835 nm pump power is evident. It is thought that this may possibly arise from the saturation of the 835 nm excited state absorption, although it may also be due to the 835 nm pump beam moving (and hence launch efficiency changing) as the power was attenuated. Significant improvements to these results may be expected when using a fibre of lower background loss than the current value of 0.3 dB/m. $Pr^{3+}$-doped ZBLAN fibres with losses of ≈0.1 dB/m have previously been fabricated [7]. The red transition at 635 nm was the only one on which laser oscillation could be obtained when using the 10 m length of fibre.

Since it was clear that by no means all of the 10 m length of fibre was significantly pumped further experiments were then carried out on a fibre length of ≈1.2 m. With this length of fibre the 635 nm transition was below threshold unless added feedback was provided and so it was possible to investigate other laser transitions. Using a cavity containing two mirrors of >99% reflectivity in the red butted against the fibre, incident pump power thresholds as low as 40 mW at 1.01 μm with 10 mW at 835 nm and 40 mW at 835 nm with 20 mW at 1.01 μm were obtained. This fibre length is much shorter than the optimum since the ground state absorption at 1.01 μm is <2 dB/m for this fibre and so a longer fibre length would allow more pump power to be absorbed.

The mirror at the output end of the cavity was then changed to one of ≈40% reflectivity at 605 nm and ≈20% reflectivity at 635 nm. With this cavity laser oscillation was observed at 605 nm on the $^3P_0$-$^3H_6$ transition. The 1.01 μm pump power was set to 1 W and the 605 nm output power measured as a function of the 835 nm output power and the results are shown in FIG. 3. For low values of 835 nm pump power the slope efficiency is approximately 7% with respect to incident pump power. The saturation of the 605 nm output power with respect to 835 nm pump power is thought to arise from the saturation of the 835 nm excited state absorption. The maximum 605 nm power extracted was approximately 30 mW. An improved performance should be possible with a longer fibre length where there would greater absorption at both pump wavelengths. The 835 nm power was then set to 600 mW and the 605 nm output power measured as a function of 1.01 μm power. These results are also shown in FIG. 3, where the slope efficiency with respect to 1.01 μm pump power is ≈3.3%.

Both mirrors were then changed to mirrors of >99% reflectivity in the green. With a cavity completed with the mirrors laser oscillation was observed at 520 nm on the $^3P_1$, $^1I_6$-$^3H_5$ transition. A threshold of ≈160 mW of each pump wavelength was measured. Since the output coupling was <1%, the extracted output power was only of the order of 1 mW. For high pump powers simultaneous lasing in the green and red was observed. Clearly significant improvements in performance should be possible with a cavity using an optimised fibre length and an output coupler of higher transmission.

Laser oscillation has also been observed in the blue at 491 nm on the $^3P_0$-$^3H_4$ three-level transition when completing the cavity with two high reflectors at this wavelength. The lowest threshold recorded was ≈200 mW of 835 nm pump power and 280 mW at 1.01 μm. Again, the extracted powers were of the order of 1 mW because of the low transmission of the output coupler. For high pump powers simultaneous lasing at 635 nm occurred.

DISCUSSION

We have demonstrated continuous-wave room temperature infrared-pumped upconversion lasers based on $Pr^{3+}$-doped fluorozirconate fibre which operate at blue, green, orange and red wavelengths. We believe that these are the first reported CW room temperature infrared pumped visible lasers. There is clearly plenty of scope for improving on the performance that we have obtained to date. By using a smaller core fibre with a cut-off wavelength of ≈450 nm it should be possible to reduce the pump powers required at each wavelength by up to a factor of four since the intensity scales inversely with the core area. This will reduce the threshold powers required for laser oscillation in the red to a level well within reach of that available from laser diodes. In addition to improvements resulting from the reduction in core diameter, further significant improvements should result from using a longer fibre length than the 1.2 m used for demonstrating laser oscillation in the blue, green and orange. Additionally, any pump light which was not absorbed in a single pass through the fibre could be fed back to be absorbed on a second pass. It is, therefore, not unreasonable to expect the thresholds for lasing on these transitions also to come down to a level available from semiconductor diode lasers. We believe that the results contained in this letter represent a significant step towards the realization of practical all-solid-state blue green and red upconversion lasers. Such devices have the attraction of cheapness and simplicity and could be expected to find numerous applications in a wide variety of fields.

In order to obtain a suitable balancing between outputs of blue, green and red light it may be necessary to provide means for absorbing or suppressing production of some of the red light, and such an absorption means preferably takes the form of a suitable co-dopant which can be arranged either in the core or in the cladding.

REFERENCES

[1] Kozlovsky, W. J., Lenth, W., Latta, E. E., Moser, A. and Bona, G. L.: "Generation of 41 mW of blue radiation by frequency doubling of a GaAlAs diode laser", Appl. Phys. Lett., 1990, 56, pp.2291–2292

[2] Risk, W. P., Pon, R., and Lenth, W.: "Diode laser pumped blue-light source at 473 nm using intracavity frequency doubling of a 946 nm Nd:YAG laser", Appl. Phys. Lett., 1989, 54, pp.1625–1627

[3] Hebert, T., Wannemacher, R., Lenth, W. and Macfarlane, R. M.: "Blue and green cw upconversion lasing in Er:YLF$_4$", Appl. Phys. Lett., 1990, 57, pp.1727–1729

[4] Allain, J. Y., Monerie, M., and Poignant, H.: "Blue upconversion fluorozirconate fibre laser", Electron. Lett., 1990, 26, pp.166–168

[5] Allain, J. Y., Monerie, M., and Poignant, H.: "Room temperature CW tunable green upconversion holmium fibre laser", Electron. Lett., 1990, 26, pp.261–263

[6] Allain, J. Y., Monerie, M., and Poignant, H.: "Tunable CW lasing around 610, 635, 695, 715, 885 and 910 nm in praseodymium-doped fluorozirconate fibre", Electron. Lett., 1991, 127, pp.189–191

[7] Carter, S. F., Szebesta, D., Davey, S. T., Wyatt, R., Brierley, M. C. and France, P. W.: "Amplification at 1.3 μm in a Pr$^{3+}$-doped single-mode fluorozirconate fibre", Electron. Lett., 1991, 27, pp.628–629

We claim:

1. An optical fibre laser for upconversion of infrared energy, comprising:

first means for generating infrared radiation that has a first wavelength of approximately 1010 nanometers;

second means for generating infrared radiation that has a second wavelength of approximately 835 nanometers;

Pr$^{3+}$-doped optical fibre in which the concentration of Pr$^{3+}$ is in the range of substantially 50 ppm to 10,000 ppm for absorbing said first and second wavelengths to generate visible radiation that has a wavelength in the range of approximately 491 to 635 nanometers; and reflection means, coupled to said first and second means for generating infrared radiation and said Pr$^{3+}$-doped optical fibre, for generating optical feedback at said generated visible radiation wavelength to cause lasing of said generated visible radiation.

2. The laser as set forth in claim 1, wherein said first wavelength radiation raises the energy level of at least some of said Pr$^{3+}$ ions from the $^3H_4$ state to the $^1G_4$ state, and said second wavelength radiation raises the energy level of at least some of said Pr$^{3+}$ ions in the $^1G_4$ state to a state selected from the group of energy levels comprising the $^1I_6$, $^3P_1$, $^3P_0$ and $^3P_2$ levels.

3. The laser as set forth in claim 2, wherein said reflection means generates optical feedback at a wavelength of approximately 635 nanometers to cause lasing at a wavelength of approximately 635 nanometers caused by resonant enhancement of radiative decay of said Pr$^{3+}$ ions at the $^3P_0$ level to the $^3F_2$ level.

4. The laser as set forth in claim 2, wherein said reflection means generates optical feedback at a wavelength of approximately 605 nanometers to cause lasing at a wavelength of approximately 605 nanometers caused by resonant enhancement of radiative decay of said Pr$^{3+}$ ions at the $^3P_0$ level to the $^3H_6$ level.

5. The laser as set forth in claim 2, wherein said reflection means generates optical feedback at a wavelength of approximately 520 nanometers to cause lasing at a wavelength of approximately 520 nanometers caused by resonant enhancement of radiative decay of said Pr$^{3+}$ ions at the $^3P_0$ and $^1I_6$ levels to the $^3H_5$ level.

6. The laser as set forth in claim 2, wherein said reflection means generates optical feedback at a wavelength of approximately 491 nanometers to cause lasing at a wavelength of approximately 491 nanometers caused by resonant enhancement of radiative decay of said Pr$^{3+}$ ions at the $^3P_0$ level to the $^3H_4$ level.

* * * * *